Sept. 8, 1964   J. KIRKHOPE   3,147,613
APPARATUS FOR ULTRASONIC FLAW DETECTION
Filed Dec. 27, 1960   6 Sheets-Sheet 1
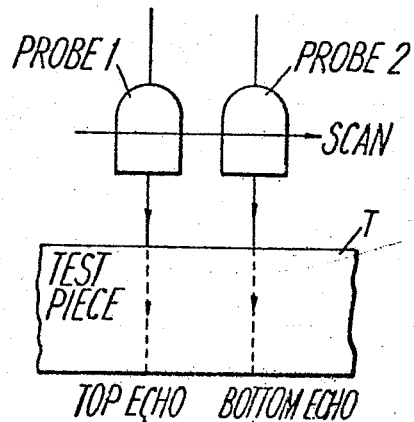
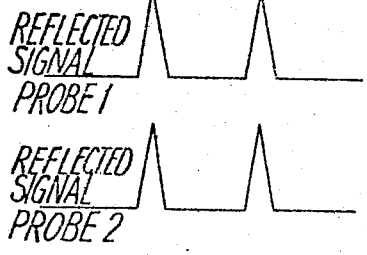
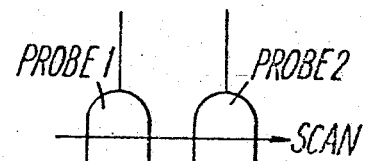
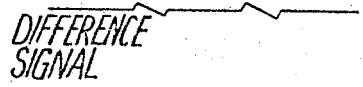
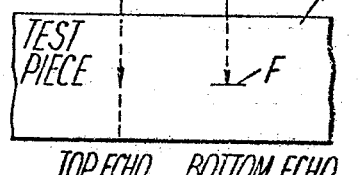
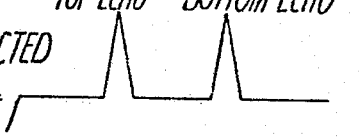
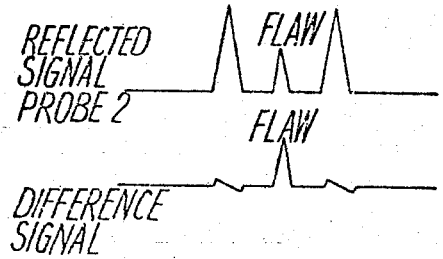
Fig. 1
Fig. 2
Inventor
James Kirkhope
By
Cushman, Darby, Cushman
Attorneys Sept. 8, 1964 J. KIRKHOPE 3,147,613
APPARATUS FOR ULTRASONIC FLAW DETECTION
Filed Dec. 27, 1960 6 Sheets-Sheet 2
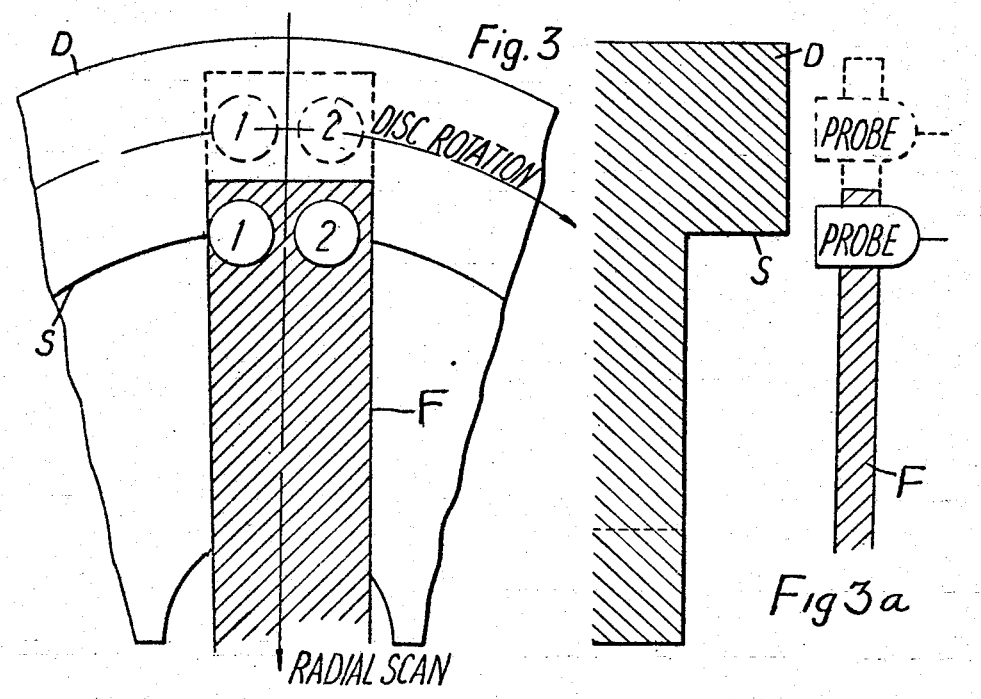
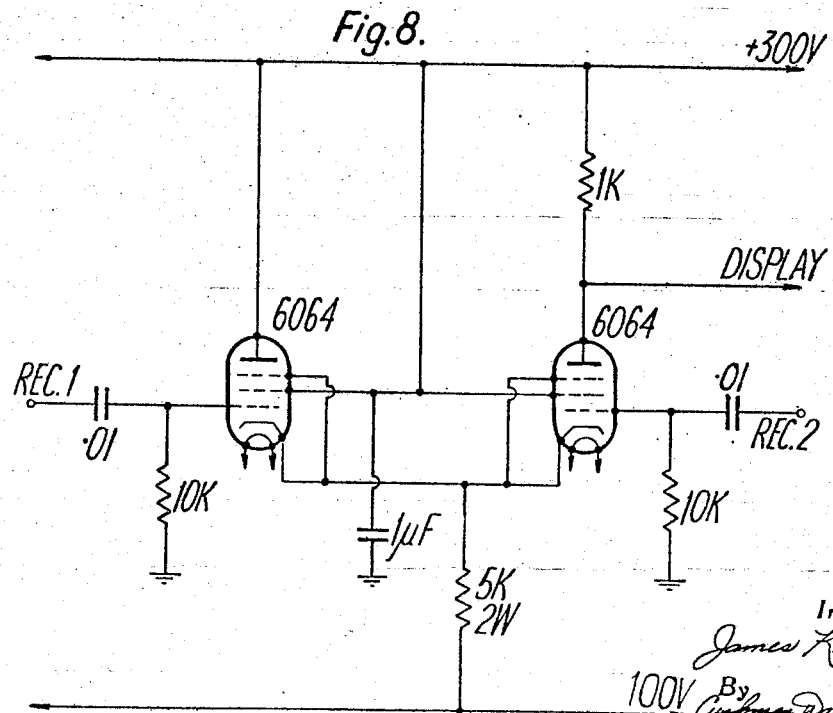
Inventor
James Kirkhope
By Cushman, Darby Cushman
Attorneys

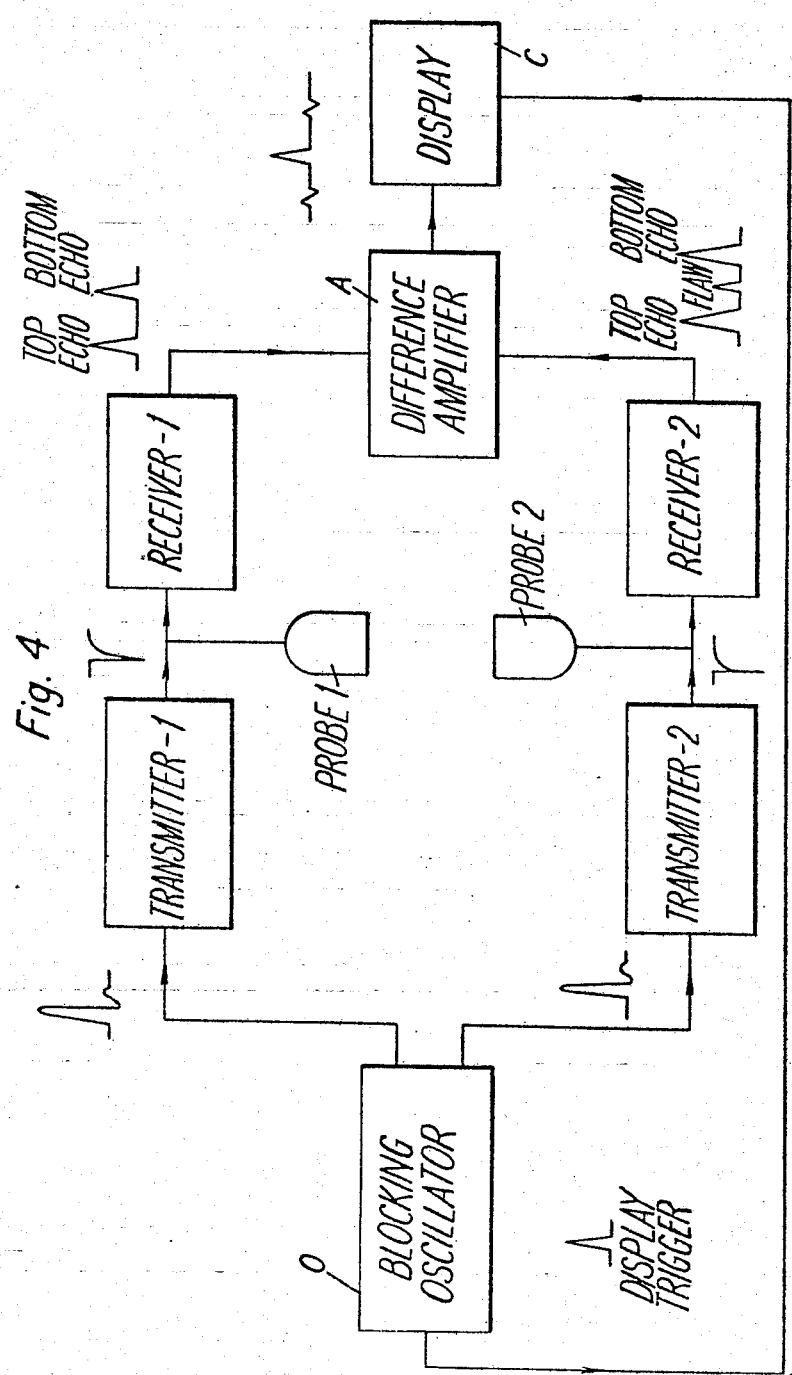

Sept. 8, 1964 J. KIRKHOPE 3,147,613
APPARATUS FOR ULTRASONIC FLAW DETECTION
Filed Dec. 27, 1960 6 Sheets-Sheet 6

Inventor
James Kirkhope
By Cushman, Darby & Cushman
Attorneys

United States Patent Office 3,147,613
Patented Sept. 8, 1964

3,147,613
APPARATUS FOR ULTRASONIC FLAW
DETECTION
James Kirkhope, Ville Lemoyne, Quebec, Canada, assignor to Rolls-Royce Limited, Derby, England, a company of Great Britain
Filed Dec. 27, 1960, Ser. No. 78,663
3 Claims. (Cl. 73—67.7)

This invention relates to the detection of flaws in articles, and particularly in metal articles.

The detection of flaws in articles may be effected by converting an electrical impulse into mechanical vibrations of ultrasonic frequency by means of a transducer which passes the vibrations into the article being tested, the vibrations being reflected at the boundary or boundaries of the article and at a discontinuity or flaw lying in the paths of the vibrations. The reflected vibrations are received back by the transducer or another transducer and re-converted to electrical impulses to give an indication of the situation of the flaw in relation to the boundaries of the article. The impulses may be displayed on a cathode ray oscillograph by deflecting the scanning spot at right angles to the time base, the distance of the deflection caused by the impulse from the flaw from the deflections caused by boundary echoes indicating the location of the flaw relative to these boundaries.

The transducer or probe utilises the piezoelectrical properties of a crystal, for example quartz or barium titanate, and, in one apparatus, is held in contact with the surface of the specimen, a film of oil or other suitable lubircant being provided between the face of the probe and that of the article to avoid wear of the probe and for passing the vibrations into the specimen.

In another apparatus the probe and article are immersed in a liquid, for example, water, the probe being spaced from the surface of the article. This arrangement has the advantages of reducing wear of the probe as physical contact with the article does not occur, and of rendering the operation more consistent as variations in surface contact, which may occur with the previous method, are avoided.

One inherent disadvantage of these apparatus is the production of a so-called "dead zone." This means that flaws occurring in the layer below the top surface of the article, say ¼", cannot be detected as the echo from the flaw cannot be distinguished on the cathode ray tube from that from the top surface of the article.

It will be also appreciated that more than one echo will be obtained from each boundary surface, and from the flaw, due to reflection of part of the pulse occurring internally of the article. This further complicates the problem of recognising the flaw echo on the cathode ray tube.

With an article which changes in section, for example, a turbine disc forging, further difficulties are introduced. An experienced operator can vary the time base as the article section changes during scanning. The problem, however, becomes acute where the section changes abruptly since an abrupt change of section causes multiple echoes to be received from the pulse, the beam of which is of finite width.

Semi-automatic inspection of articles of simple shape is possible by the addition of a monitor. The gate width is set such that only the first echo from a flaw is received and the monitor is arranged to sense this first echo and thus indicate when a flaw is under the probe, for example, by stopping the automatic scanning mechanism and/or producing audible warning when a pulse of given energy level is received in the gate. This entails an increase in the dead zone as the gate has to be set to exclude boundary echoes entirely, whereas a skilled operator can in some cases at least distinguish a flaw echo from this boundary echo.

The present invention thus seeks to provide apparatus for avoiding or reducing some at least of the disadvantages discussed above by eliminating so far as possible pulses other than those produced by flaws.

According to the present invention there is provided apparatus for the ultrasonic inspection of an article comprising first and second transducer probes, means to pass electrical impulses into said probes to be converted into beams of in-phase pulses of ultrasonic vibrations, first and second receiver means to convert echoes of said pulses of ultrasonic vibrations received back at said first and second probes into first and second sets of discrete electrical signals respectively, a difference amplifier comprising a gate valve having a control grid and a suppressor grid, said control grid being normally biased to cut-off, means inverting the first set of discrete electrical signals to produce negative biasing signals and applying said negative signals to the suppressor grid, means applying the second set of discrete electrical signals to the control grid, whereby a resultant signal representing the difference between said first and second sets of discrete electrical signals is produced by said difference amplifier, and means, receiving said resultant signal, and indicating whether a flaw is present in the article.

If the probes and their associated individual circuits are closely matched and the portions of the article under the probes are similar, similar outputs will be obtained, and a substantially zero difference signal produced. If, however, a flaw is present under one of the probes, the difference signal will consist of the signal produced by the flaw which will be more easily distinguishable as, once again, other echoes from each probe will be substantially completely cancelled out.

The invention is particularly suitable for the detection of flaws in circularly-symmetrical articles such as, for example, turbine disc forgings of gas turbine engines. The web of a turbine disc forging normally tapers in thickness from the hub to the outer edge and also has abrupt changes in section for example, at the rim and also possibly at intermediate radius where a flange may be formed to constitute the rotating member of an air seal when the disc is assembled into the engine.

The article is preferably a circularly-symmetrical article, such, for example, as a turbine disc forging, the probes being arranged in line along a circular path extending around the axis of symmetry of the article, and relative movement of the probes and article being produced along said circular path.

Preferably also relative movement between the two probes and the article is produced radially so that the probes scan the whole surface of the article.

Any circularly-symmetrical change in section of the article, whether abrupt or gradual, thus appears simultaneously under both probes and thus substantially complete cancellation of signals resulting from boundary echoes can be obtained, leaving only the signal produced by the echo from a flaw which may be under one probe.

The invention will now be described, merely by way of example, with reference to the accompanying diagrammatic drawings in which:

FIGURES 1 and 2 illustrate the effect of the invention;

FIGURE 3 illustrates the scanning of a turbine disc, the frame-carried probes being illustrated in two positions as indicated by the solid and dash lines:

FIGURE 3A shows a cross sectional view of the structure shown in FIGURE 3.

FIGURE 4 shows the electronic part of the apparatus in block form;

FIGURES 5, 6, 7 and 8 show circuit diagrams of units of the electronic apparatus.

Figure 5:
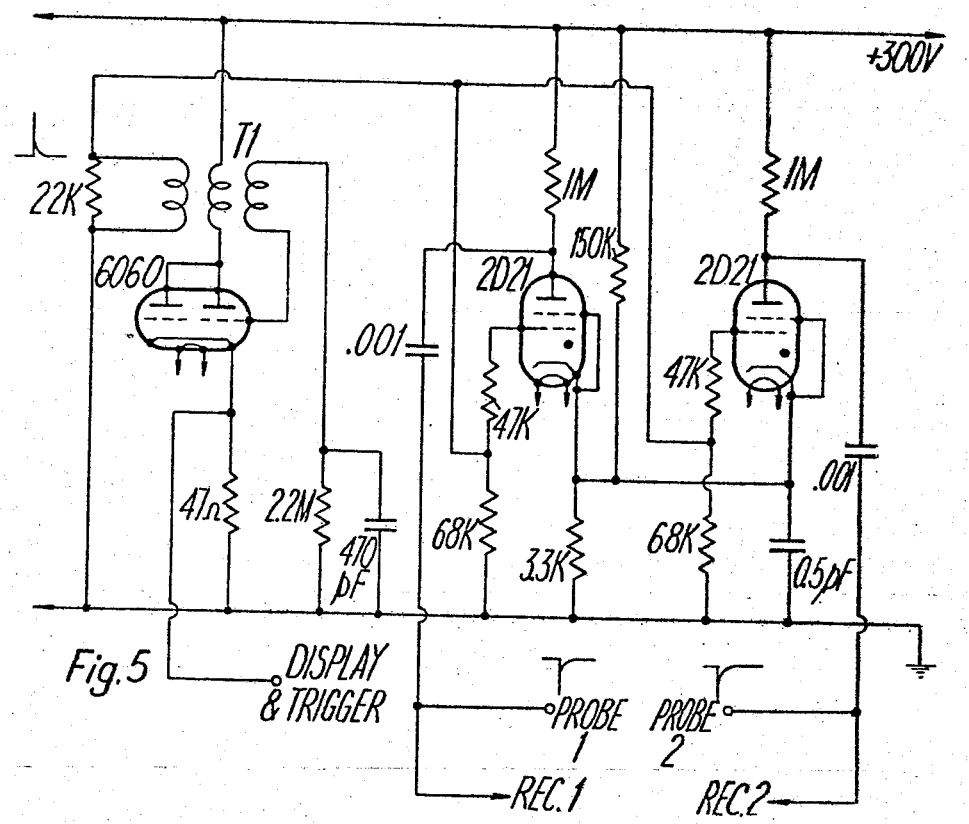

In FIGURE 1 two probes 1, 2 (which form part of an electronic circuit described below) are shown being scanned over and passing pulses of ultrasonic vibrations into an unflawed portion of a specimen or test piece T, the probes 1, 2 and test piece T being immersed in a liquid such as water. These pulses are reflected back at both the bottom and top surfaces of the test piece T and the reflected signals are shown individually for each probe and also the difference signal from the two probes is shown. The top and bottom echoes substantially cancel each other and only a small residual indication remains.

FIGURE 2 shows the effect where a flaw F is present under probe 2 at about the middle thickness of the test piece T. The signal from probe 1 is the same as that given in FIGURE 1, but the signal from probe 2 shows an additional pulse produced by the flaw F between the pulses from the top and bottom surfaces of the test piece T. The resultant signal from the two probes shows the flaw signal more clearly, substantially complete cancellation of top and bottom echoes again being obtained.

In FIGURE 3 the two probes 1, 2 are shown scanning a circularly-symmetrical article such as a turbine disc forging D. The two probes 1, 2 may be mounted upon any convenient frame structure F which may be translated by any suitable mechanism (not shown) in a radial direction with respect to the disc D. With the disc also rotating, each radial scan of the probes 1, 2 will cover a different area of the disc. Taking the position of the disc at any moment, when the probes on frame F move in a radial direction so that the two probes cross the step S in the forging D the signals produced are as given in FIGURES 1 and 2. When both of the probes 1, 2 are over the step S the signals from each are extremely complex, multiple return echoes being received from both section thicknesses of the step S due to the finite beam width of the pulses from the probes 1, 2. The difference signal will again show substantially complete cancellation of all echoes except those received from a flaw under one of the probes.

FIGURE 4 shows in block form the electronic circuit of which the probes 1, 2 form part. A blocking oscillator O running at approximately 300 c.p.s. pulse repetition frequency is used to trigger transmitters 1 and 2 to drive the corresponding probes. The outputs from the probes 1, 2 are respectively fed to separate wide band receivers 1, 2 and the video output from each receiver is applied to a fast recovery differences amplifier A. The output of the difference amplifier A is displayed as a normal A-scan on a cathode ray tube C, the time base being triggered from the blocking oscillator O at the same time as the transmitter units.

FIGURE 5 shows the circuit, together with component values, of the blocking oscillator and transmitter units.

The valve denoted 6060, in conjunction with the pulse transformer T1 forms a free running blocking oscillator, the pulse repetition frequency of which is determined by the time constant of the 2.2 M and 470 pf. components. Positive going pulses from one winding of T1 are applied to the control grid circuits of each of the thyratron valves 2D21. Each valve 2D21 and its immediately associated circuitry comprises a respective one of the transmitters 1, 2. The anode of each transmitter valve 2D21 is connected to the respective probe and receiver.

In the periods between pulses from the blocking oscillator, the valves 2D21 are held in the non-conducting state by cathode bias (determined by the 150K and 3.3K component chain), and the .001μf. condensers in series with the probes charge up through the 1M anode loads to the H.T. voltage (+300). When a trigger pulse from the blocking oscillator is applied to the control grids, cathode bias is overcome, and the thyratrons conduct, discharging the .001μf. condensers rapidly. The transient high voltage negative pulse thus applied to the probes causes the transducers to ring mechanically, and transmit an ultrasonic pulse.

When the discharge of the .001μf. condensers brings the anode voltage of the 2D21 valves down to a sufficiently low voltage, the valves can no longer sustain their ionization and cease to conduct.

Figure 6:
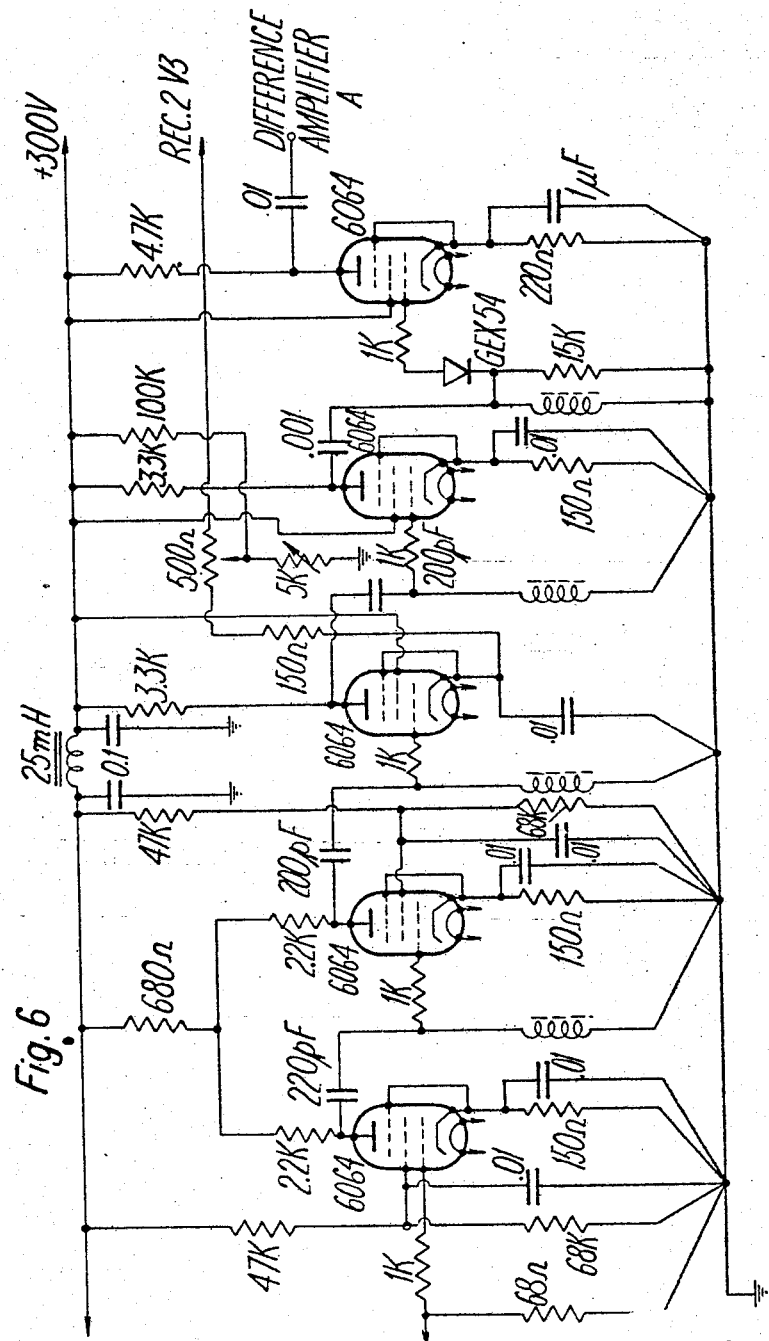

FIGURE 6 shows the circuit diagram of receiver 1. Receiver 2 is identical to this, but it should be noted that the gain control (the 100K and 5K variable components) and differential gain control (the 500 Ω var. component) shown on the diagram are shared by both receivers.

The receiver is a four stage fixed tuned radio frequency amplifier followed by a crystal detector and one stage of video amplification. The R.F. gain is approximately 30,000 and the bandwidth 5 mc./s. Each tuned circuit comprises a coil in parallel with valve input and stray capacitances, and stagger tuning is applied to stages 1 and 3 to obtain the required overall bandwidth.

The input from the associated probe is fed to the control grid of the valve, denoted 6064 on the extreme left of FIGURE 6, through a 1K grid stopper resistance. Negative feedback is applied to the first pair of valves by the 680 Ω common anode resistor. Spurious feedback via the H.T. line is eliminated by the decoupling R.F. choke between the first pair and last pair of R.F. amplifying valves 6064.

Simultaneous gain control of both receivers is obtained by varying the positive cathode bias on the third valve of each receiver by means of the 5K variable resistor. Differential gain control of one receiver relative to the other (in order to balance their output pulse amplitudes) is achieved by the 500 Ω potentiometer.

The detector is a germanium dioxide GEX 54 and the video amplifier provides an output of positive polarity to the difference amplifier.

Figure 7:
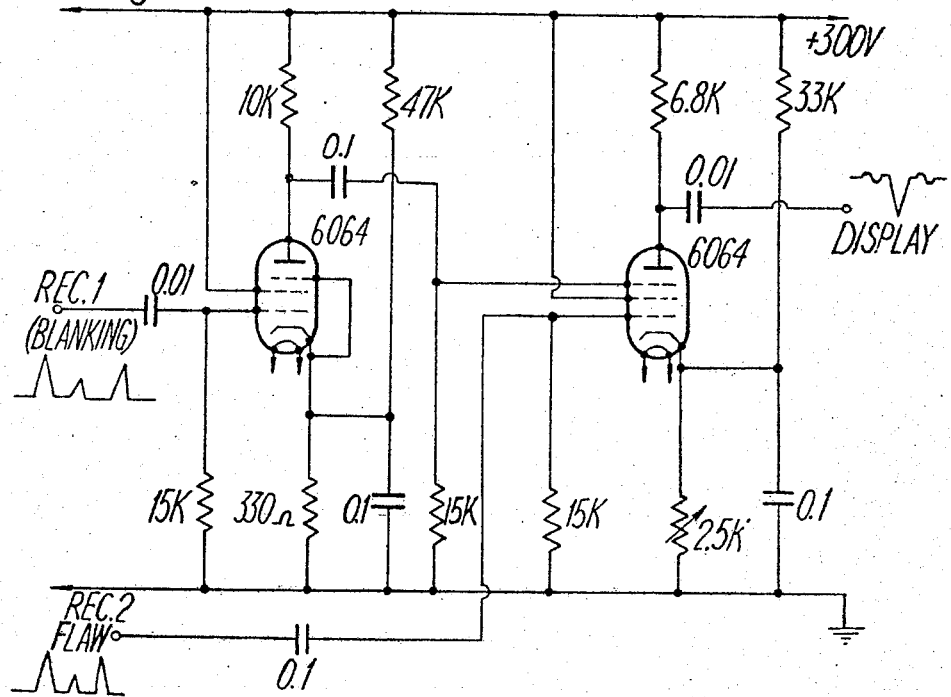

FIGURES 7 and 8 show circuit diagrams of two types of difference amplifier. In FIG. 7 the left hand pentode inverts the incoming signal from receiver 1, and applies the inverted signal to the suppressor grid of the right hand pentode. The signal from receiver 2 is applied to the control grid of the right hand pentode. The right hand valve acts as a "gate" with two control electrodes.

With no input, the gate valve is kept cut-off by cathode bias (determined by the 2.5K variable resistor). Positive pulses applied to the control grid cause the valve to conduct only if the suppressor grid is above the suppressor cut-off potential i.e. only if there are no coincident negative pulses being applied to the suppressor grid. Thus back and front surface echoes which appear in both receiver channels simultaneously do not give an output at the gate anode. However, flaw echoes appearing at the control grid are not matched simultaneously at blanking echoes at the suppressor grid, thus flaw signals are amplified and appear as negative going pulses at the gate valve anode.

It should be noted, that with this form of difference amplifier, a flaw output from the gate is obtained only when probe 2 (the "flaw" probe) is over a flaw. Flaw signals appearing via receiver 1 (when the blanking probe is over a flaw) cannot give rise to an output from the gate, as of course, an unpaired negative pulse at the suppressor grid merely serves to keep the gate valve cut off.

In FIG. 8 the two pentodes form a conventional cathode coupled difference amplifier. In the absence of a signal both valves conduct in a balanced manner due to the self balancing effect of the common cathode auto-bias resistor (5K). If identical positive pulses are simultaneously applied to both control grids both valves attempt to conduct harder, but due to the fact that an increase of cathode current through either valve biases off the other valve, there is in fact no resultant increase in current through either valve. Thus where simultaneous signals are applied from receiver 1 and receiver 2 (as in the case of back and front surface echoes), no output results at the anode of the right hand pentode.

Should a positive pulse be applied from receiver 2 (the "flaw" channel) to the grid of the right hand valve, which is not simultaneously matched with a pulse in receiver 1, then the right hand valve will succeed in conducting harder (at the expense of a decrease in current through the left hand valve) and an amplified negative going pulse will result at the anode of the right hand pentode.

It should be noted, that with this form of difference amplifier, a positive pulse appearing from receiver 1 which is not matched by a similar pulse from receiver 2 (i.e. the condition of the probe being over a flaw) will give rise to a positive output pulse at the anode of the right hand pentode. It is quite a simple matter however to arrange that the display device (e.g. a cathode ray oscilloscope) is made to respond only to negative pulses, by incorporating a crystal diode in its input circuit.

I claim:

1. Apparatus for the ultrasonic inspection of an article comprising first and second transducer probes, means to pass electrical impulses into said probes to be converted into beams of in-phase pulses of ultrasonic vibrations and directed towards said article therefrom, first and second receiver means connected respectively to said first and second probes to convert echoes of said pulses of ultrasonic vibrations received back at said first and second probes into first and second sets of discrete electrical signals respectively, a difference amplifier comprising a gate valve having a control grid and a suppressor grid, said control grid being normally biased to cut-off, means inverting the first set of discrete electrical signals to produce negative biasing signals and applying said negative signals to the suppressor grid, means applying the second set of discrete electrical signals to the control grid, whereby a resultant signal representing the difference between said first and second sets of discrete electrical signals is produced by said difference amplifier, and means, receiving said resultant signal, for indicating whether a flaw is present in the article.

2. Apparatus for the ultrasonic inspection of an article comprising first and second transducer probes, means to pass electrical impulses into said probes to be converted into beams of in-phase pulses of ultrasonic vibrations and directed towards said article therefrom, first and second receiver means connected respectively to said first and second probes to convert echoes of said pulses of ultrasonic vibrations received back at said first and second probes into first and second sets of discrete electrical signals respectively, a difference amplifier comprising first and second pentodes, the first pentode having a control grid which is normally biased to cut-off and which is connected to receive said first set of electrical signals, and an anode, the second pentode having a suppressor grid which is connected to said anode of the first pentode to bias the said suppressor grid beyond cut-off when said first signals are received at the control grid of the first pentode, the second pentode also having a control grid which is normally biased to cut-off and which is connected to receive said second set of electrical signals, and an anode, whereat a resultant signal appears, and means, receiving said resultant signal for indicating whether a flaw is present in the article.

3. Apparatus for the ultrasonic inspection of an article, as set forth in claim 2, further comprising scanning means to produce relative motion between said probes and said article along a predetermined path.

References Cited in the file of this patent

UNITED STATES PATENTS

| | | |
|---|---|---|
| 2,602,327 | Bond | July 8, 1952 |
| 2,612,772 | McConnell | Oct. 7, 1952 |
| 2,985,009 | Henry | May 23, 1961 |
| 3,074,267 | Martin | Jan. 22, 1963 |